United States Patent [19]

Amirav et al.

[11] Patent Number: 5,055,677

[45] Date of Patent: Oct. 8, 1991

[54] MASS SPECTROMETER METHOD AND APPARATUS FOR ANALYZING MATERIALS

[75] Inventors: Aviv Amirav, Sderot Bialik 58, Ramat Hasharon; Albert Danon, Petach Tikva, both of Israel

[73] Assignee: Aviv Amirav, Ramat Hasharon, Israel

[21] Appl. No.: 542,142

[22] Filed: Jun. 22, 1990

[30] Foreign Application Priority Data

Jul. 13, 1989 [IL] Israel .......................................... 90970

[51] Int. Cl.[5] ........................ B01D 59/44; H01J 49/00

[52] U.S. Cl. ...................................... 250/282; 250/288

[58] Field of Search .................... 250/288, 288 A, 281, 250/282, 423 R; 73/863.12

[56] References Cited

U.S. PATENT DOCUMENTS

| | | | |
|---|---|---|---|
| 4,845,367 | 7/1989 | Amirav et al. | 250/281 |
| 4,863,491 | 9/1989 | Brandt et al. | 250/288 A |
| 4,911,805 | 3/1990 | Ando et al. | 219/76.16 |
| 4,960,992 | 10/1990 | Vestal et al. | 73/863.12 |
| 4,977,785 | 12/1990 | Willoughby et al. | 73/863.12 |

*Primary Examiner*—Bruce C. Anderson
*Attorney, Agent, or Firm*—Benjamin J. Barish

[57] ABSTRACT

A method and apparatus for analyzing a material by: forming and injecting into a vacuum chamber of a mass spectrometer a supersonic molecular beam of a carrier gas mixed with a sample of the material to be analyzed; ionizing the material in the supersonic molecular beam; mass-separating the ions according to their mass; and detecting the mass-separated ions of the material to be analyzed. The ions in the supersonic molecular beam may be filtered from ions of the thermal background molecules and carrier gas after the ionizing step but before the detecting step. The detected ions may then be used for identifying the material.

16 Claims, 3 Drawing Sheets

MASS SPECTROMETER METHOD AND APPARATUS FOR ANALYZING MATERIALS

BACKGROUND OF THE INVENTION

The present invention relates to a method of analyzing a material by mass-spectrometry (MS), and also to a mass spectrometer apparatus for use in the novel method.

The basic elements of any mass spectrometer include: (a) sample introduction and gasification system; (b) ion source; (c) tunable mass filter (or mass analyzer); d ion detector; (e) vacuum chambers to allow the above; and (f) data processing and presentation arrangements.

In conventional mass-spectrometry, the sample introduction is made either using a direct insertion through an air-lock, or through the coupling with a gas chromatograph. The sample molecules at the ion source are in the form of thermal gaseous molecules at the ion source temperature.

OBJECTS AND BRIEF SUMMARY OF THE INVENTION

An object of the present invention is to provide a mass-spectrometry method and apparatus having a number of important advantages over the conventional method and apparatus, which advantages will be more particularly described below.

According to the present invention, there is provided a method of analyzing a material comprising the steps: forming and injecting into a vacuum chamber of a mass spectrometer a supersonic molecular beam of a carrier gas mixed with a sample of the material to be analyzed; ionizing said material in the supersonic molecular beam; mass-separating the ions according to their mass; detecting said mass-separated ions of the material to be analyzed; and utilizing said detected ions for identifying the material thereof.

The molecular beam may be a collimated beam or an uncollimated free jet.

Preferably, the method includes the further step of filtering the ions in the supersonic molecular beam from ions of the thermal background molecules and carrier gas after the ionizing step. The filtering step may be performed either before, or after, the mass-separating step.

According to a further feature, the vibrational supercooling prevailing in the supersonic molecular beam induces a substantial increase in the relative height of the molecular weight peak and allows its isotopic abundance analysis.

Preferably, the material to be analyzed is placed and vaporized behind the nozzle of the supersonic molecular beam source at about atmospheric pressure. The ionizing step may be performed according to any of the known techniques, for example by electronic impact with tuneable electron energy, to form positive ions by electron attachment or to form negative ions, or by photoionization.

According to further features, the material may be fed to the supersonic molecular beam from a gas chromatograph, and the supersonic expansion serves as a jet separator to enrich the material concentration in the molecular beam. The filtering step transfers ions above a given mass to the detector and thus also performs as a crude mass-separating step. The ion detector serves both as a universal or as a functional selective specific detector for the gas chromatograph.

According to still further features, the mass separated ions are monitored with respect to time at a given mass so as to serve as a functional specific detector for a gas chromatograph; also, the supersonic molecular beam may be chopped to allow lock-in amplification data analysis.

The carrier gas is preferably helium, but may be hydrogen, argon, nitrogen or a mobile gas of a super fluid chromatograph that disolves molecules in it and forms large clusters, e.g. $CO_2$ or $NH_3$. The mass spectrometer may be a quadrupole or any other known mass spectrometer.

According to still further features, there is provided a method of analyzing a material comprising the steps: locating the material to be analyzed behind a supersonic nozzle source at about atmospheric pressure; injecting the material to be analyzed into a vacuum chamber of a mass spectrometer in a supersonic expansion; ionizing the material; mass-separating the ions according to their mass; and detecting the mass-separated ions of the material to be analyzed.

The invention also provides apparatus for analyzing a material in accordance with the above method.

TECHNICAL DISCUSSION

Supersonic molecular beams (SMB) are characterized by five main properties: (a) extreme supercooling of the molecular internal vibrational and rotational degrees of freedom; (b) a controlled amount of kinetic energy in the hyperthermal energy range of up to 30 eV; (c) unidirectional motion in space; (d) mass focussing of heavy species into the centerline of the molecular beam; and (e) high pressure non- vacuum sample inlet behind the supersonic nozzle. The present invention exploits these five unique properties of SMB to greatly improve the performance of mass spectrometers (MS), or particularly gas chromatograph-mass spectrometers (GC-MS), as will be described below. The invention is described below particularly with respect to an example using electron impact ionization (EI) in an axial beam-ionizer configuration and a quadrupole mass spectrometer (QMS) as a mass analyzer, but it will be appreciated that the invention could also be applied in other ionization and mass analysis methods.

The sensitivity of any mass spectrometer depends on both the ionization efficiency and the amount of existing background noise. The ionization effeciency of electron impact (EI) is lower in SMB-MS mostly due to the shorter time spent by the molecule in the ion source when the ion source is operated at the fly-through mode. In this mode of operation the molecular beam is collimated and passed through the ionizer without colliding its walls and thus its very low vibrational-rotational temperature as well as high kinetic energy is retained. On the other hand, the background ionization efficiency is retained, and thus the mass spectrum of the cold molecules is usually masked by their self-background, namely the ionization of surface scattered thermalized sample molecules. This expected reduced ionization efficiency, and the required increased pumping capacity associated with supersonic molecular beams would appear to lead one away from using a supersonic molecular beam in a mass spectrometer. However, as will be shown below, there are many advantages in the use of a supersonic molecular beam in a mass spectrometer which far outweigh these disadvantages.

Molecular aerodynamic acceleration in supersonic beams is based on the co-expansion of hydrogen or helium carrier gas with the heavier organic molecules. The use of hydrogen as a carrier gas increases the molecular kinetic energy upon its co-expansion from the nozzle to the hyperthermal range (1–30 eV). Helium, however, as a heavier gas, is superior to hydrogen in vibrational cooling and can be the optimal choice in both cooling and aerodynamic acceleration. In argon the vibrational cooling is even better but at the price of much lower available kinetic energy. The nozzle can be a simple pinhole, a channel, a slit nozzle, or a conical shaped nozzle to increase cluster formation. Pulsed nozzle operation can further enhance all its properties and reduce the pumping capacities required.

The motion directionality and the hyperthermal kinetic energy is used to filter out the background mass spectrum of thermal molecules in the vacuum chamber by applying a low (~ −1 eV) retarding voltage which reject ions of background molecules alone, and thus the obtained mass spectra is clean and represent only those energetic molecules which entered the MS in the supersonic beam. The total supression of background contribute to a superior sensitivity in spite of the two orders of magnitude lower ionization Yield due to the much shorter time the molecule spent in the ionizer (10–30 μ sec). In addition, an open ion source allows the increase of the ionizing electron current by more than an order of magnitude.

The vibrational cooling induces a substantial increase in the observed molcular undissociated ion. The relative increase in the abundance of molecular ion can be several orders of magnitude in large polyatomic molecules. On the other hand, the fragmentation pattern is sometimes only slightly affected, and is amenable for comparison with the available thermal 70 eV EI mass spectra. The observed spectra contain information that usually is obtained in the combination of EI and chemical ionization (CI), but the parent ion complex of lines is amenable for accurate isotopic analysis, unlike in CI, resulting in a possible elemental analysis. In addition the relative parent ion peak height contains new structural and isomeric information. The EI-SMB MS fragmentation pattern is totally controlled by the electron energy and information concerning ionization potential, ion bond strengths and order of appearance can be extracted. In EI-SMB-MS molecular thermal decomposition on the metal walls of the ionizer is avoided and the temperature limit in the application to thermally labile molecules can be that in deactivated quartz. Negative ion formation due to free electron attachment or charge exchange (negative chemical ionization) can be enhanced by many orders of magnitude because of the vibrational supercooling.

Sample insertion is very easy and fast. It is performed behind the nozzle which has helium or hydrogen backing pressure slightly above atmosphere and thus the sample is introduced in a simple screw without using any air-lock and bypassing pumping. This property combined with the absence of background, facilitate a very fast and easy mass spectrometry and allows an order of magnitude increased number of mass analysis performed per unit time. A sample may be introduced as a solid, liquid or even a dilute solution with on-line vaporization of the solvent. Alternatively, the carrier gas pressure may be reduced slightly below one Atm for the continuous "head space" analysis or sniffing of the MS inlet gases surrounding.

In the coupling of a gas chromatograph (GC) to a mass spectrometer (GC-MS), the supersonic nozzle serves as an efficient jet separator for the efficient transfer of GC molecules into the MS ionizer. The new EI-SMB-GC-MS is expected to exhibit a "tail free" operation as thermalized molecules following sequence of absorption-desorption cycles are not detected. The tail free operation allows the coupling of short capillary column fast GC to the MS, and GC-MS operation of thermolabile molecules that spend a short time in the short column high flow GC. The coupling of high temperature (e.g., 480° C.) GC with the MS through the supersonic molecular beam is also made possible in contrast to conventional GC-MS. The background elimination is also anticipated to allow the MS to serve as a GC detector with universality as in the thermal conductivity detector but with sensitivity superior to that of a flame ionization detector. The SMB-MS would appear useful as a specific functional selective detector with or without molecular pyrolisis or oxidation, and would also appear to be compatible with other complementary ionization methods, such as photoionization, chemical ionization and hyperthermal surface ionization.

We also note that the same idea of ion filtration of beam species against background molecules can also be adopted in the coupling of superfluid chromatograph (SFC). In this case large clusters of the studied molecules are complexed with the mobile $CO_2$ monomer. They move at the velocity of the monomer, and thus acquire hyperthermal kinetic energy.

Finally the mere process of ion filtration because of the molecular initial kinetic energy can serve by itself as a crude mass analyzer or a mass spectrometer In supersonic molecular beams the available kinetic energy linearly increases with the molecular mass and it can serve for its electrostatic mass separation.

BRIEF DESCRIPTION OF THE DRAWINGS

The invention is herein described, by way of example only, with reference to the accompanying drawings, wherein:

FIGS. **1*a* and 1*b*** are schematic diagrams illustrating experimental setups of mass spectrometers in accordance with the present invention;

Figure 4:
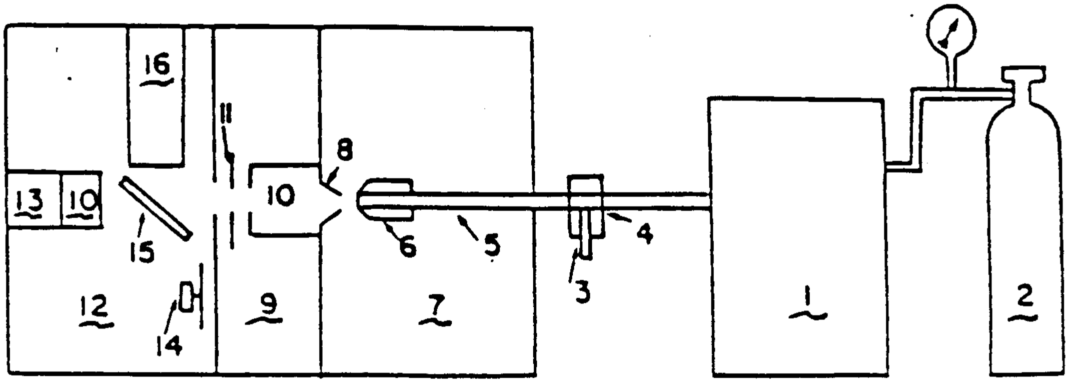

FIGS. **2*a* and 2*b*** illustrate electron impact ionization mass spectra of 1-bromopentane;

FIGS. **3*a*–3*c* are electron impact ionization mass spectra of bromopentane isomers; and FIG. 4** is a schematic diagram of an experimental setup of a mass spectrometer containing both electron impact ionization and surface ionization ion sources coupled to a hyperthermal supersonic molecular beam source.

DESCRIPTION OF PREFERRED EMBODIMENTS

FIG. **1*a* schematically illustrates a setup for producing a mass spectrum in supersonic molecular beams (EI-SMB-MS). The sample mixture is injected into a gas chromatograph (GC) 1. In the GC output it is mixed with a carrier gas 2, preferably a light carrier gas such as hydrogen or helium. Alternatively, the molecular sample is introduced in a small container 3 inserted into a small temperature controlled vaporization chamber 4. The molecular vapour is mixed with the carrier gas and is transferred in the separately heated gas transfer line 5 into a separately heated supersonic nozzle 6**. The gas mixture expands into the vacuum chamber 7 which is typically pumped by a 4" or 6" diffusion pump.

The supersonic free jet is skimmed at 8 and the supersonic jet also serves as a very efficient jet separator in transferring most of the heavy organic molecules through the skimmer into the second vacuum chamber 9 directly to the electron beam ionizer 10 in an unperturbed motion. The organic molecules in the beam are ionized at 10 and the ions are transferred via the aid of the ion lens 11 into the high vacuum chamber 12 which contains the quadrupole mass analyzer and its ion detector 13. The lens can serve for the selective transfer of ions of the beam molecules without those of the carrier gas and background molecules.

It is also possible to square wave modulate the molecular beam using a mechanical chopper 14 which will be positioned in the SMB trajectory. This chopper allows the signal processing using lock-in amplification in order to discriminate against background mass spectrum of the vacuum chamber residual gasses when conventional EI-MS is used. Vacuum chambers 9 and 12 can be unified into a single chamber pumped by a single pump, while chamber 7 can be pumped by a single rotary pump for certain applications.

Figure 1A:
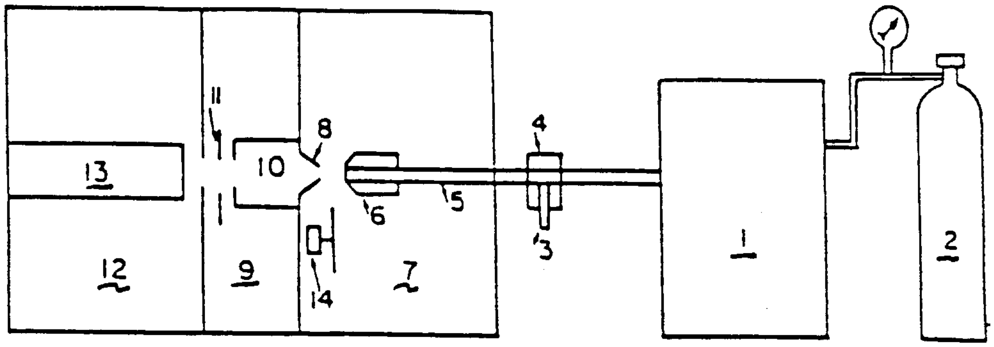
Figure 1B:
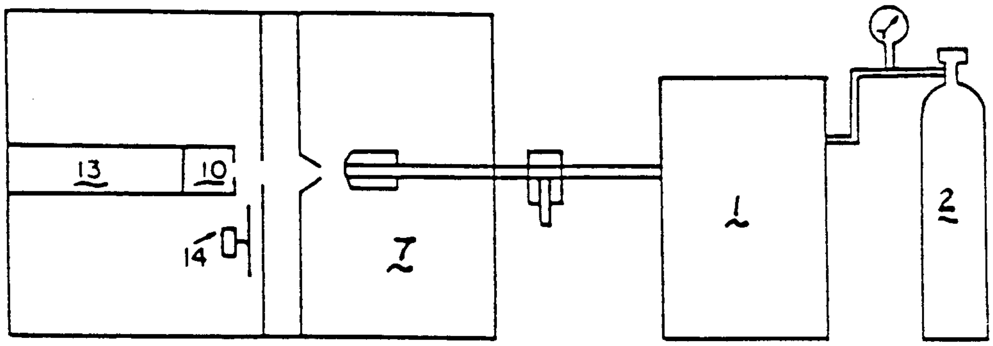

FIG. 1*b* illustrates a commercially available quadrupole mass spectrometer (such as UTI-100° C.) which already contains its own integrated ionizer and in which the molecular beam chopper is positioned in the high vacuum chamber. Thus, whereas in FIG. 1*a* the ionizer is separated from the quadrupole mass analyzer and is close to the nozzle for increased ionization yield, in FIG. 1*b* the ionizer is conveniently mounted on the quadrupole mass spectrometer, as is commercially available. Finally, we note that while quadrupole mass analyzer has been used, this method is also compatible with other mass analysis methods such as magnetic mass filter, ion trap, time of flight, FT-MS, etc.

PROPERTIES AND ADVANTAGES OF EI-SMB-MS

1. Increased Sensitivity

While the ionization efficiency in SMB is expected to be up to two orders of magnitude lower than in conventional sampling, the obtained signal to noise ratio is expected to be increased due to the many orders of magnitude lower noise level involved. In hyperthermal supersonic molecular beam (HSMB), the properties of the directionality and high molecular kinetic energy can be used for the total elimination of background mass spectra of thermal molecules in the ionizer chamber. This background filtering is achieved through the selective control of the ion energy. In an axial fly-through operation the ion energy is the sum of the electrically given ion energy plus the neutral molecule kinetic energy. In hyperthermal beams when hydrogen is used as a carrier gas this energy can easily exceed 10 eV. If now the ions will be rejected by giving them a small (negative) retarding ion energy ($\sim -1$ eV), a total rejection of ions formed from thermal molecules will be ensured. On the other hand, ions formed from molecules in the HSMB will retain their original kinetic energy of several eV minus 1 eV and thus will be efficiently transferred through the ion lens into the quadrupole mass analyzer where they will be mass analyzed.

Figure 2A:
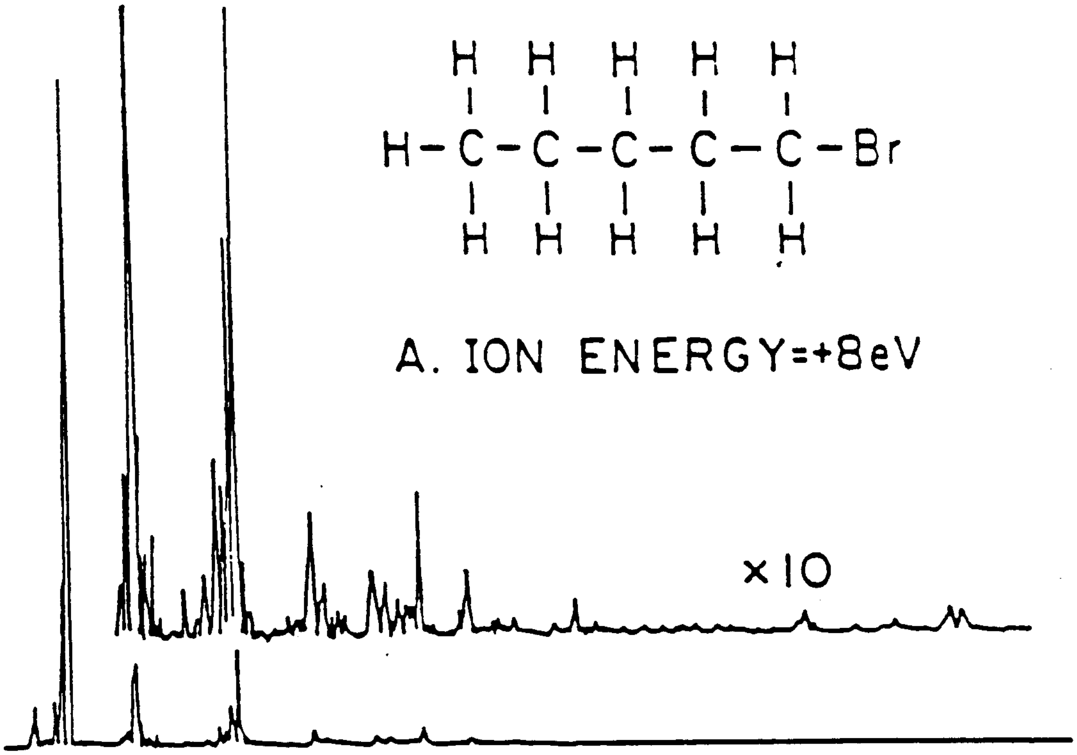
Figure 2B:
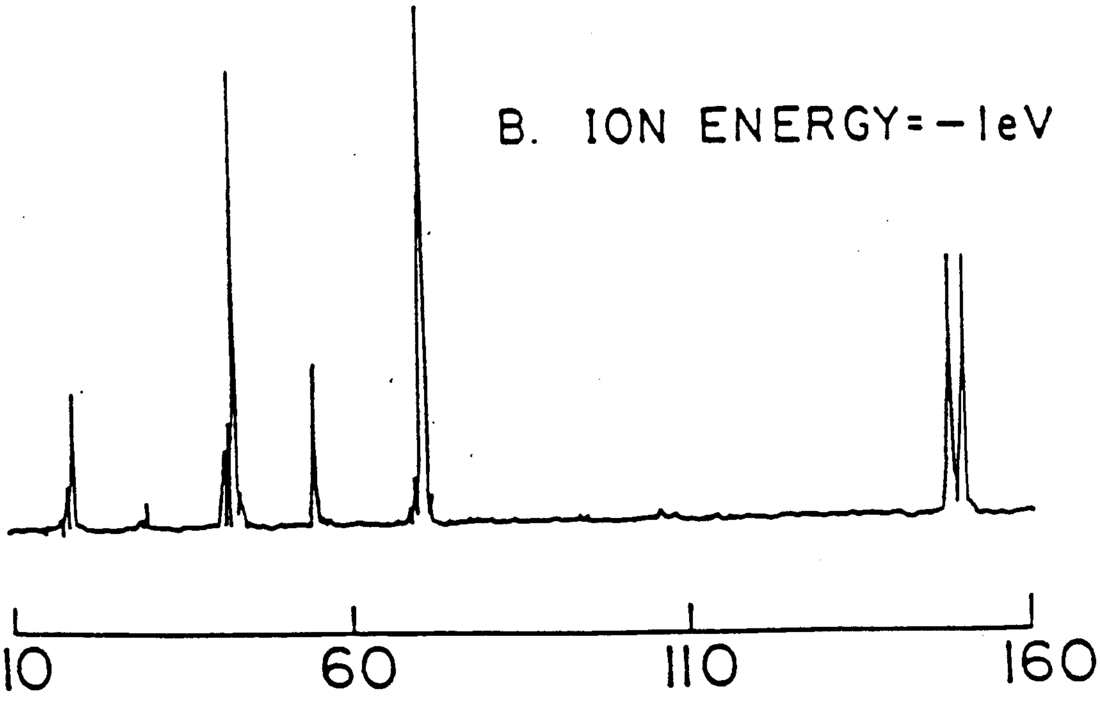

FIGS. 2*a* and 2*b* illustrate this drastic effect in the 70 eV EI-MS of 1-bromopentane which is injected in a hyperthermal supersonic molecular beam at a rate of $\sim 1$ nanogram sec into the QMS ionizer. The upper mass spectrum of FIG. 2*a* shows the result of a conventional operation of the QMS, wherein the MS is totally dominated by water, CO, $CO_2$, rotary pump oil and many other fragments. In the lower mass spectrum of FIG. 2*b*, the ion energy was reduced to $-1$ eV and a clean mass spectrum of 1-bromopentane can be seen including the parent undissociated molecular ions (two bromine isotopes) and several fragment ions.

It will also be noted that the molecular beam may be square wave modulated and the signal can be processed using a lock-in amplifier. In this way, however, the background is not eliminated but is turned into a much smaller noise of $(N)^{1/2}$, instead of N where N is the number of generated ions per unit time constant.

While the use of HSMB and background ion filtration is superior in the total background elimination, SMB modulation and lock-in amplification might be used in the conventional EI-MS mode of operation as schematically shown in FIG. 1*a*. In this way the full EI ionization efficiency is retained while the background MS is reduced. Lock-in amplification is especially desired in the mode of selected ion monitoring of low mass ions where the required modulation frequency is low and the background reduction achieved is substantial.

2. Increased Time Resolution in a GC-MS - Tail Free Operation

One of the problems associated with the use of MS as a GC detector is known as "tailing".

The "tailing" emerges as the result of many cycles of adsorption and desorption on the walls of the complex EI ion source even at the temperature of 250° C. This slow molecular desorption rate increases the time that the molecule spends in the ionizer and is amenable for ionization and detection and reduces the GC time resolution especially when low volatility molecules are studied.

In HSMB only the unscattered molecules can be transferred after being ionized to the mass analyzer. Surface scattered molecules will lose their energy and turn into thermal molecules which cannot enter the mass analyzer. Thus, the real initial time resolution of the GC can be preserved.

It will be noted that beam modulation and lock-in amplification also separate the in phase beam molecules and the background scattered molecules and the full GC time resolution is preserved in this way as well. Usually beam modulation is achieved by the use of a conventional mechanical chopper. However, in supersonic beams a pulsed valve, can also be used with the advantage of a substantial reduction of the carrier gas load.

3. Largely Increased Mass Spectral Information

Perhaps the most important aspect of EI-SMB-MS is the unique molecular weight and structural information obtained. This important aspect is the result of the large intramolecular vibrational cooling.

In a large polyatomic molecule the amount of internal thermal vibrational-rotational energy can be very large. The high temperature molecular vibrational energy is $Ev=(3N-6)kT$ where N is the number of atoms in the molecule, k is the Boltzmann constant and T is the ionizer temperature which in many applications is $\sim 250°$ C. In large polyatomic molecules the high temperature limit for the heat capacity is reached even below room temperature due to the exponential increased density of states with Ev.

In conventional 70 eV electron energy electron impact ionization the molecular ion dissociates for two main reasons: (a) the electron induced ionization process increases the ion vibrational energy by several electron volts; and (b) the thermal molecular vibrational energy is carried out in the electron induced ionization to the ion due to the Franck-Condon principle and is added to the electron induced vibrational excitation.

This thermal energy contribution to the ion vibrational energy can exceed the electron excitation contribution in large polyatomic molecules. For example, dioctylphtalate has 66 atoms and at 250° C. its average internal thermal vibrational energy can be 8.3 eV. Obviously the combination of these two sources of vibrational energy leads to the highly undesirable feature of EI-MS of the lack of molecular peak in a large portion of molecules and especially in complicated polyatomic molecules. Even if the molecular weight peak exists as a minor peak, it cannot be trusted. This state of affairs dictates the usage of additional softer ionization method such as chemical ionization (CI) to supplement EI. The EI ionization method is still desirable because of the large amount of information given in the fragmentation pattern. Even the techniques of CI in several cases does not yield a pronounced molecular weight peak because of the internal thermal vibrational energy and because of the usually weaker chemical bond in the molecular ion as compared to its parent neutral molecule (one electron less for the chemical bonds).

Figure 3A:
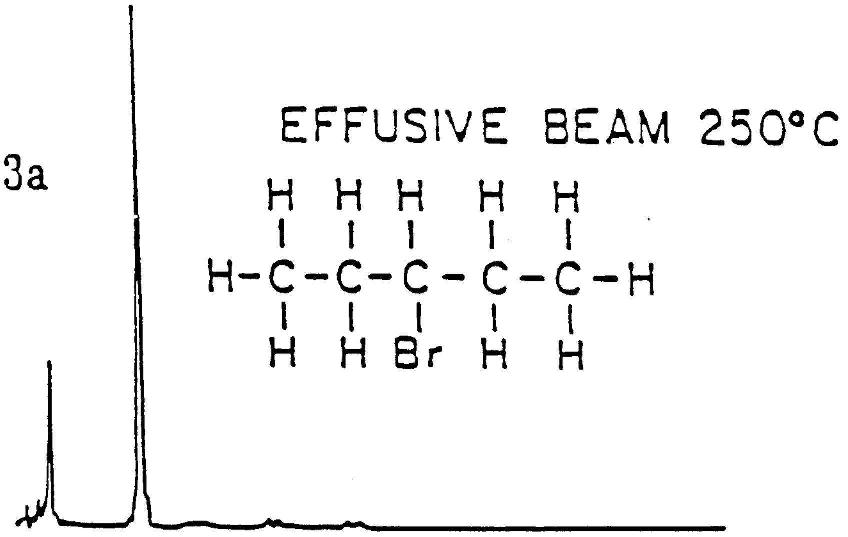
Figure 3B:
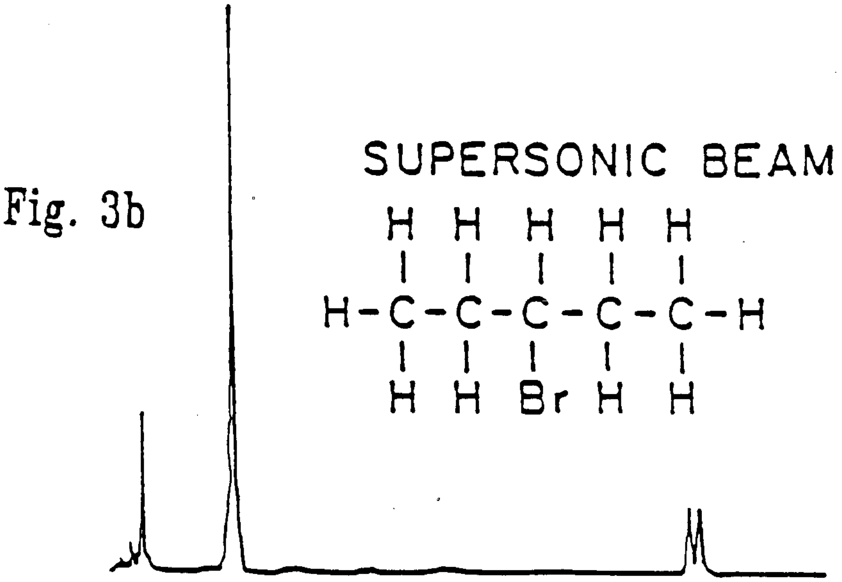
Figure 3C:
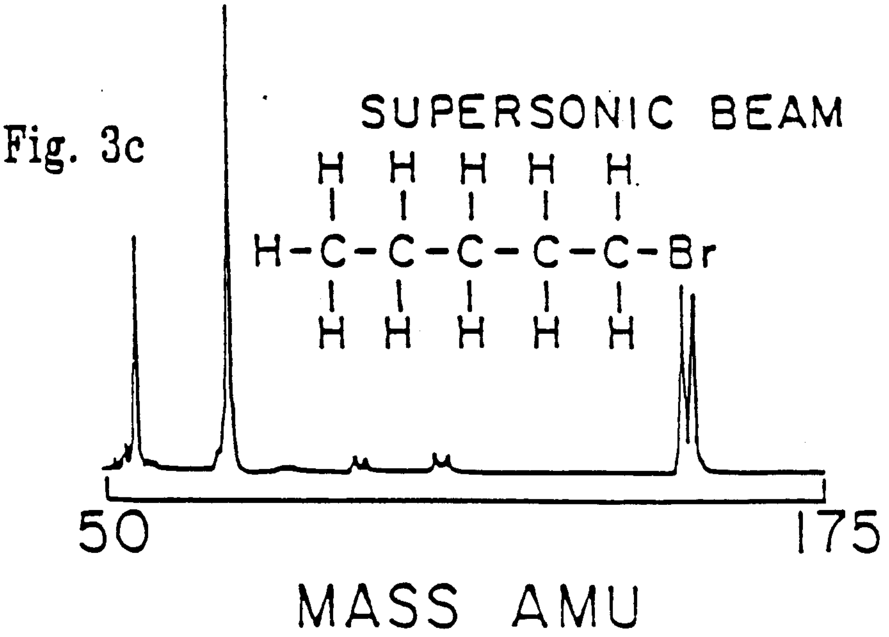

One of the well-known properties of supersonic molecular beams is the large vibrational-rotational cooling encountered which results in less than 0.1 eV internal vibrational energy. Accordingly, the information content in EI-SMB-MS is largely increased due to the following reasons:

a. Molecular Peak. The EI-MS spectra of supercooled molecules is expected to show a highly pronounced molecular weight peak. FIGS. 3*a*–3*c* compare the conventional EI-MS, with the mass spectra obtained in the supersonic molecular beam (EI-SMB-MS).

FIG. 3*a* illustrates the mass spectrum of 3-bromopentane obtained using an effusive molecular beam generated from a temperature controlled orifice at 250° C. The 70 eV EI-MS shows no parent molecular weight peak and only fragment peaks are observed. The molecular peak strongly decreased with the molecular vibrational temperature, and at 250° C. it was below 0.1% of the $C_5H_{11}$ fragment peak height at 71 AMU, in both 3-bromopentane and 2-bromopentane. Similar 70 eV EI-MS spectra are given in the literature which show no molecular peak.

FIG. 3*b* illustrates the mass spectrum obtained in a fly-through mode of operation using a supersonic molecular beam. Actually, all the experimental conditions were identical as in FIG. 3*a* except that argon carrier gas (similar results with hydrogen) was added (200 torr backing pressure) to form a supersonic molecular beam with the 3-bromopentane at the same nozzle temperature of 250° C. and electron energy of 70 eV. Two molecular weight peaks are now clearly observed due to the two bromine 79 and 81 isotopes, each one of them is about 13% of the 71 AMU fragment height. FIG. 3*c* illustrates the mass spectrum of a similar setup as 3*b*, except the sample molecules are 1-bromopentane.

It will thus be seen that FIGS. 3*a*–3*c* demonstrate an increased relative abundance of the molecular weight peak by more than two orders of magnitude in EI-SMB-MS as compared to conventional EI-MS. It is anticipated that this state of affairs is general and it was also found in dioctylphtalate, cholesterol, methylstearate etc. The importance of this effect is expected to increase with the molecular size (number of atoms). Basically, the EI-SMB-MS can be considered to contain the combined information of conventional EI and CI, but following is an explanation of why it may even be superior to that combination.

b. Exact Isotope Ratio in the Molecular Complex Peaks. The molecular identification is usually obtained from the information gathered on the molecular weight, fragmentation pattern and the exact quantitative isotopic ratio analysis of the various complex of the peaks of the undissociated parent ions. This later analysis cannot be performed in CI due to the large and unknown amount of proton transfer that results sometimes in $M\pm1$ peaks.

The EI-SMB-MS shows the exact isotope ratio which is now both in a prominant relative peak and also contains no unknown background contributions. In FIGS. 3*b*–3*c*, for example, the doublet of molecular weight peaks separated by 2 AMU immediately suggests the existence of one bromine atom and its lack in the 71 AMU fragment which exactly corresponds to M-Br. It is to be noted that accurate isotopic analysis can yield molecular elemental analysis.

c. Structural and Isomeric Information. The use of EI-SMB-MS is expected to significantly amplify structural mass spectral and isomeric effects which sometimes are only subtle. FIGS. 3*a*–3*c* demonstrate the above in the comparison of EI-SMB-MS of 1-bromopentane (lower trace) and 3-bromopentane. It is clearly observed that the molecular peak in the secondary bromine compound is smaller by a factor of three (relatively unstable primary cation). This effect is much harder to study in conventional EI-MS where the molecular peak hardly exist or is totally buried in the noise or background.

d. Total Fragmentation Tunability. In EI-SMB-MS the electron energy is the only single experimental parameter that governs the degree of ion fragmentation. This state of affairs implies that the degree of fragmentation observed can be uniquely controlled using a single "knob" of the electron energy. This control can assure, in cases of doubts, the existence of a molecular peak with much less sacrifice in sensitivity. In addition, the total ion current versus electron energy can be obtained and fitted to simple empirical formulas and the approximate ionization potential can be extracted. The same fitting procedure can be performed while monitoring a given fragment and the approximate bond strength of several bonds in the ion can be evaluated. Actually, all these ideas are well-known and established on small molecules. However, their implementation on large polyatomic molecules was hampered by thermal vibrational inhomogeneous effects. The use of EI-SMB-MS can revive these ideas.

e. Van der Waals Complexes. In the rare event that the molecular peak is still very weak, it can be further enhanced by the generation of weakly bound argon van der Waals complexes (when argon is used as a carrier gas). The excess vibrational energy of the ion is now expected to be released in the bond scisson of these weakly bound atoms. The observation of further enhanced molecular weight peak, combined with the appearance of additional peaks at a known added mass of the carrier gas, may serve for the total verification of the molecular weight peak. Finally, it is to be noted that the EI-MS of van der Waals complexes is unique to SMB and widen its scope.

f. Library Search. As was demonstrated in 3- and 1-bromopentane in FIGS. *3a–3c*, the main difference between EI-MS and EI-SMB-MS is in the relative peak height of the molecular parent ion. This molecular ion is exponentially reduced with the vibrational temperature while other ions are at a relative "steady state" relative abundance as they also gain population. Thus, the fragmentation pattern of EI-SMB-MS is similar in its general appearance to that of EI-MS, and should be compatible with the existing libraries. The software should be modified to consider the existance of the molecular peak but to ignore its relative height. A final confirmation should be performed by the isotopic analysis of the molecular weight complex of peaks.

g. Negative Ion. The vibrational supercooling can increase by several orders of magnitude the electron attachment cross-section and the ion's lifetime. Both in free electron attachment and negative chemical ionization, a much larger group of molecules will be amendable for negative ion MS in SMB.

4. Reproducibility Reliability and Reduced Thermal Decomposition

The reliability and reproducibility is expected to be better than in conventional EI-MS as there are no ionizer daily temperature variation effects, no variable background peaks and no thermal or catalytic molecular decomposition on the ionizer metallic walls and filament, which may vary between different instruments. As the molecular insertion can be performed using deactivated quartz tubes and transfer lines and the nozzle can be made from a ceramic or quartz, EI-SMB-MS can be performed on an increased range of thermally labile molecules.

5. Compatibility With a GC

The supersonic nozzle vacuum chamber having a 4" diffusing pump (Varian VHS-4) can accept over 200 cc/min of hydrogen and thus is compatible with most types of gas chromatographs, using both packed and capillary column. The hydrogen carrier gas is added directly from the FID detector $H_2$ flow controller. The supersonic free jet expansion serves as a very efficient built-in jet separator and may transfer over 50% of the organic heavy molecules into the ionizer.

6. Selective and Non-Selective Detection of a GC a. Non-Selective Universal Detector. In this mode the mass analyzer serves as an electrostatic lens (RF only in quadrupoles) and transmit all masses. As in HSMB the molecular kinetic energy linearly increases with the mass and the EI-HSMB ionizer can be tuned to transfer ions above ~10 AMU which includes over 99.9% of all known molecules. (The only notable exceptions are He and $H_2$). The background noise will be determined by carrier gas impurities and column bleeding and thus the total expected sensitivity is equivalent to that of a flame ionization detector but with the generality of a thermal conductivity detector. In HSMB, the hydrogen carrier gas possesses only thermal energy and thus the basic selectivity against the carrier gas is retained.

b. Selective and Specific Detector. The use of EI-HSMB-MS offers the unique advantages of a single detector which is ultra-sensitive, extremely selective, linear over a wide range and which can be tuned to many functional groups in a single instrument. The functional selective operation can be based on three main procedures:

(a) Mass spectral properties and fragmentation patterns. Iodides for example give a noticeable iodine peak in the EI-MS and thus they can be traced by ion selective detection at 127 AMU.

(b) The organic molecules can be thermally decomposed by heating them in a heated tube before (or after) mixing them with the hydrogen carrier gas. Alcohols can be detected as CO at 28 AMU, organic acids and esters can be detected by ion monitoring of $CO_2$ at 44 AMU and nitroso compounds by the detection of NO at 30 AMU.

(c) The organic molecule can be oxidized and burnt in oxygen in a heated tube. In this way nitrogen containing molecules can be detected as NO, sulphur containing molecules as $SO_2$ and halogen containing molecules can be detected as the atomic halogen or HX where X is the halogen.

The elimination of background mass spectral peaks is of special importance in the low mass range of 10–80 AMU which is very prominent in any vacuum chamber residual gas mass spectrum. This mass spectral range contains most of the functional group masses.

7. Fast Sample Introduction and Easy Operation

In EI-SMB-MS the molecular sample can be directly introduced. In a typical operation in our laboratory the hydrogen backing pressure and flow are regulated with a needle valve to be ~800 torr behind the nozzle. The sample is introduced through a simple Wilson seal without any use of the time consuming air-lock and bypass pumping. Actually, the sample is introduced as a solid, liquid or a solution in a few seconds and its insertion depth determines its temperature. The mass spectrum is then obtained in a few seconds on the osciloscope and is averaged. The ionizer cleanliness in SMB-MS is of much reduced importance but the gas transfer line from the sample introduction chamber to the nozzle needs to be very clean, with minimal volume and held at ~250° C. as in a GC.

Another appealing sample introduction approach involves a direct gas or air sampling. The hydrogen backing pressure is reduced to 740–730 torr and air is introduced through a needle due to the pressure difference. In this sampling mode relatively volatile samples can be analyzed in a continuous fashion.

8. Coupling with Other Methods of Ionization a. Hyperthermal Surface Ionization. Hyperthermal surface ionization (HSI) constitutes a very promising new ionization technique. An extensive description of HSI is given in U.S. Pat. No. 4,845,367 by A. Amirav and A. Danon. As HSI is also based on the use of HSMB it also possesses several of the advantages of EI-HSMB such as the lack of background mass spectral peaks, tail free efficient coupling to a GC and the possible usage as an extremely sensitive and selective GC detector. The extreme sensitivity of HSI, its unique fragmentation pattern and the use of hyperthermal supersonic molecular beam makes it an ideal complementary ionization technique to EI-SMB.

VARIATIONS AND OTHER APPLICATIONS

FIG. 4 schematically illustrates a setup that contains both EI-HSMB and HSI ion sources. As both these techniques are based on HSMB, the basic vacuum chambers and pumping requirements are identical as in FIGS. 1*a* and 1*b*, and are therefore identified by the same reference numerals.

In HSI, however, the HSMB scatters from a solid surface which can be lowered to the beam path from a manipulator and the ions are detected by a perpendicular QMS. This perpendicular configuration represents a problem as EI-HSMB requires an axial QMS. This experimental problem can be solved in several ways as shown in FIG. 4.

1) Two QMS heads may be assembled in the high vacuum chamber 16 and 13;

2) One QMS may be installed and moved between two mounting flanges according to the desired ionization method;

3) An alternative approach is to use two nozzles instead of two QMS heads.

4) The most promising approach seems to use the configuration shown in FIG. 4 with one QMS head 90° to the beam axis. In this case the surface is moved up or down and an ion deflector is introduced in the ion path which is capable of 90° ion deflection with minimal energy abberation.

b. Photoionization. Photoionization might also be coupled to EI-HSMB either with a line light source or with a tunable vacuum ultraviolet monochromatic light in order to exploit the well defined threshold ionization behavior of the vibrationally supercooled molecules.

c. Conventional Electron Impact and Chemical Ionization The use of conventional EI and CI methods can also benefit from the use of SMB. As shown in FIG. 1*a* the nozzle can serve as an efficient jet separator and it allows the use of a mechanical chopper and lock-in amplification for automatic background substraction and for the elimination of "tailing" in the detection of a gas chromatograph. In this mode a portion of the beam scatter from the ionizer surface, thermalize, ionized and detected in the usual way. The transition from EI-SMB to EI is simply performed by switching the ion energy to +10 eV. The much longer time that the thermal molecules spend in the ionizer largely increase its ionization probability and the obtained MS is dominated by the conventional EI-MS. If the entrance and exit are made small enough (or a rotary pump is used in vacuum chambers 7 and 6), the pressure in the ionizer 10 is increased and with the use of methane as a carrier gas chemical ionization can be performed.

Alternatively, the supersonic free jet expansion may serve as a high pressure CI zone with the advantage of both vibrational cooling and the inherent built-in pressure gradient.

Another very appealing approach is to use or mix heavier alkanes as or in the carrier gas such as butane or pentane in order to promote cluster formation with the carrier gas which will induce self-chemical ionization in the cluster to yield the stable protonated molecular ion.

9. Compatability with Superfluid (and Liquid) Chromatography

The supersonic co-expansion of $CO_2$ with the organic molecules from the superfluid chromatograph into vacuum is known to result in large clusters of $M(CO_2)_n$ where M is the molecule and n is the number of $CO_2$ molecules in the cluster. Typically n can be a few hundred but it can be reduced to a few tens. These clusters move after the supersonic expansion at the velocity of $CO_2$ monomers and thus are acquired with a hyperthermal kinetic energy due to their large mass. As described before and referring to FIG. 4, the clusters can be ionized in the EI ion source 10 and the directionality and hyperthermal kinetic energy can be used to filter out the cluster ions from background ions. It is suggested then that the molecules will be declusterized through a single (or multiple) scattering from a solid surface 15 in front of the mass analyzer 16. This surface scattering at a controlled amount of kinetic energy is known to efficiently convert kinetic energy into internal vibrational energy. As the $CO_2$ intracluster bonds are much weaker, than the ordinary chemical bonds, it is anticipated that they will dissociate from the ion and the molecule with lower ionization potential, will retain the charge and can be mass analyzed.

10. Hyperthermal Mass Spectroscopy (HMS)

In certain cases where only low mass resolution of M/M=10 is required, the EI-SMB ion source by itself can serve as a mass spectrometer. In the seeded supersonic molecular beam the equal velocities of all species dictate a linear molecular kinetic energy increase with the molecular weight. After ionization a simple electrostatic deflection plate or any other method of energy analysis can be used as a mass analyzer. The simplest approach is to scan the ion energy and to derivatize the obtained ion energy scan to obtain a mass spectrum. The mass resolution can potentially be increased by the use of a high throughput pulsed helium beam up to M/M=100. Aside simplicity and high throughput the main advantages of HMS is in its virtually unlimited mass range.

While the invention has been described with respect to several preferred embodiments, it will be appreciated that many other variations, modifications and applications of the invention may be made.

What is claimed is:

1. A method of analyzing a material comprising the steps:

forming and injecting into a vacuum chamber of a mass spectrometer a supersonic molecular beam of a carrier gas mixed with a vapor sample of the material to be analyzed;

ionizing said material in the supersonic molecular beam;

mass-separating the ions according to their mass;

detecting said mass-separated ions of the material to be analyzed;

and utilizing said detected ions for identifying the material thereof.

2. The method according to claim 1, including the further step of filtering said ions in the supersonic molecular beam from ions of the thermal background molecules and carrier gas after said ionizing step but before said detecting step.

3. The method according to claim 1, wherein the vibrational super cooling prevailing in the supersonic molecular beam is sufficient to induce a substantial increase in the relative height of the molecular weight peak and the available mass spectral information.

4. The method according to claim 1, wherein the vapor sample of the material to be analyzed is formed behind the supersonic nozzle source at about atmospheric pressure.

5. The method according to claim 1, wherein said material is fed from a gas chromatograph, and the supersonic expansion serves as a jet separator to enrich the material concentration in the molecular beam.

6. The method according to claim 1, wherein said supersonic molecular beam is chopped to allow lock-in amplification data analysis.

7. The method according to claim 1, wherein said carrier gas is the mobile gas of a superfluid chromatograph such as $CO_2$ that dissolves molecules in it and forms large clusters.

8. A method of analyzing a material comprising the steps:

forming and injecting into a vacuum chamber of a mass spectrometer a supersonic molecular beam of a carrier gas mixed with a vapor sample of the material to be analyzed;

ionizing said material in the supersonic molecular beam;

filtering said ions in the supersonic molecular beam from ions of the thermal background molecules and carrier gas;

mass-separating the ions according to their mass; and detecting said mass-separated ions of the material to be analyzed.

9. A method of analyzing a material comprising the steps:

forming and injecting into a vacuum chamber of a mass spectrometer a supersonic molecular beam of a carrier gas mixed with a vapor sample of the material to be analyzed;

ionizing said material in the supersonic molecular beam;

mass-separating the ions according to their mass; and detecting said mass-separated ions of the material to be analyzed;

the vibrational super cooling prevailing in the supersonic molecular beam inducing a substantial increase in the relative height of the molecular weight peak and the available mass spectral information.

10. A method of analyzing a material comprising the steps:

locating and vaporizing the material to be analyzed behind a supersonic nozzle source at about atmospheric pressure;

injecting the material to be analyzed into a vacuum chamber of a mass spectrometer in a supersonic molecular beam;

ionizing said material in the supersonic molecular beam;

mass-separating the ions according to their mass; and detecting said mass-separated ions of the material to be analyzed.

11. Apparatus for analyzing a material comprising:

a mass spectrometer having a vacuum chamber;

means for forming and injecting into said vacuum chamber of the mass spectrometer a supersonic molecular beam of a carrier gas mixed with a vaporized sample of the material to be analyzed;

means for ionizing said material in the supersonic molecular beam;

means for mass-separating the ions according to their mass;

means for detecting said mass-separated ions of the material to be analyzed;

and means for utilizing said detected ions for identifying the material thereof.

12. The apparatus according to claim 11, including means for filtering said ions in the supersonic molecular beam from ions of the thermal background molecules and carrier gas after ionization but before detection.

13. Apparatus for analyzing a material comprising;

a mass spectrometer having a vacuum chamber;

means for forming and injecting into said vacuum chamber of the mass spectrometer a supersonic molecular beam of a carrier gas mixed with a vaporized sample of the material to be analyzed;

means for ionizing said material in the supersonic molecular beam;

means for filtering said ions in the supersonic molecular beam from ions of the thermal background molecules and carrier gas;

means for mass-separating the ions according to their mass; and means for detecting said mass-separated ions of the material to be analyzed.

14. The apparatus according to claim 13, further including means for locating and vaporizing the material to be analyzed behind the nozzle of the supersonic molecular beam source at about atmospheric pressure.

15. Apparatus for analyzing a material comprising:

a supersonic nozzle source;

means for locating and vaporizing the material to be analyzed behind said supersonic nozzle source at about atmospheric pressure;

said supersonic nozzle source injecting the material to be analyzed into a vacuum chamber of a mass spectrometer in a supersonic molecular beam;

means for ionizing said material in the supersonic molecular beam;

means for mass-separating the ions according to their mass; and means for detecting said mass-separated ions of the material to be analyzed.

16. The apparatus according to claim 15, wherein said means for ionizing said material is an electron impact ion source.

* * * * *